(12) United States Patent
Takihara et al.

(10) Patent No.: US 11,185,744 B2
(45) Date of Patent: Nov. 30, 2021

(54) GOLF BALL

(71) Applicant: SUMITOMO RUBBER INDUSTRIES, LTD., Kobe (JP)

(72) Inventors: Hironori Takihara, Kobe (JP); Hikaru Nagakura, Kobe (JP); Kai Hayashi, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 83 days.

(21) Appl. No.: 16/726,508

(22) Filed: Dec. 24, 2019

(65) Prior Publication Data
US 2020/0206576 A1 Jul. 2, 2020

(30) Foreign Application Priority Data

Dec. 26, 2018 (JP) .............................. JP2018-242103

(51) Int. Cl.
*A63B 37/02* (2006.01)
*A63B 37/00* (2006.01)
*C08L 9/00* (2006.01)

(52) U.S. Cl.
CPC ...... *A63B 37/0063* (2013.01); *A63B 37/0051* (2013.01); *A63B 37/0054* (2013.01); *A63B 37/0092* (2013.01); *A63B 37/00621* (2020.08); *A63B 37/00622* (2020.08); *A63B 37/00921* (2020.08); *C08L 9/00* (2013.01); *A63B 37/0031* (2013.01); *A63B 37/0043* (2013.01); *A63B 37/0075* (2013.01)

(58) Field of Classification Search
None
See application file for complete search history.

(56) References Cited

U.S. PATENT DOCUMENTS

| 4,373,041 | A | * | 2/1983 | Wood | C08K 5/548 |
| | | | | | 524/270 |
| 4,955,966 | A | * | 9/1990 | Yuki | A63B 37/0051 |
| | | | | | 473/359 |
| 5,697,856 | A | * | 12/1997 | Moriyama | A63B 37/0003 |
| | | | | | 473/374 |
| 6,287,218 | B1 | * | 9/2001 | Ohama | A63B 37/0003 |
| | | | | | 473/377 |
| 2001/0031670 | A1 | * | 10/2001 | Iwami | A63B 37/0003 |
| | | | | | 473/371 |
| 2001/0044346 | A1 | * | 11/2001 | Yoshida | A63B 37/0003 |
| | | | | | 473/371 |
| 2013/0005505 | A1 | | 1/2013 | Sajima et al. | |

FOREIGN PATENT DOCUMENTS

| JP | 2013-9916 A | 1/2013 |
| JP | 2013-248262 A | 12/2013 |

OTHER PUBLICATIONS

Pinova; Piccolyte A115 data sheet (2011) pp. 1-2. (Year: 2011).*

* cited by examiner

*Primary Examiner* — David J Buttner
(74) *Attorney, Agent, or Firm* — Birch, Stewart, Kolasch & Birch LLP

(57) ABSTRACT

An object of the present invention is to provide a golf ball traveling a great flight distance and having a good shot feeling and durability on driver shots. The present invention provides a golf ball comprising a core, at least one intermediate layer covering the core and a cover covering the intermediate layer, wherein the core is formed from a core rubber composition containing (a) a base rubber containing a polybutadiene, (b) an $\alpha,\beta$-unsaturated carboxylic acid having 3 to 8 carbon atoms and/or a metal salt thereof as a co-crosslinking agent, (c) a crosslinking initiator, and (d) a terpene-based resin, and a material hardness (Hm) of the intermediate layer and a material hardness (Hc) of the cover satisfy an equation of $Hm \leq Hc$.

15 Claims, 1 Drawing Sheet

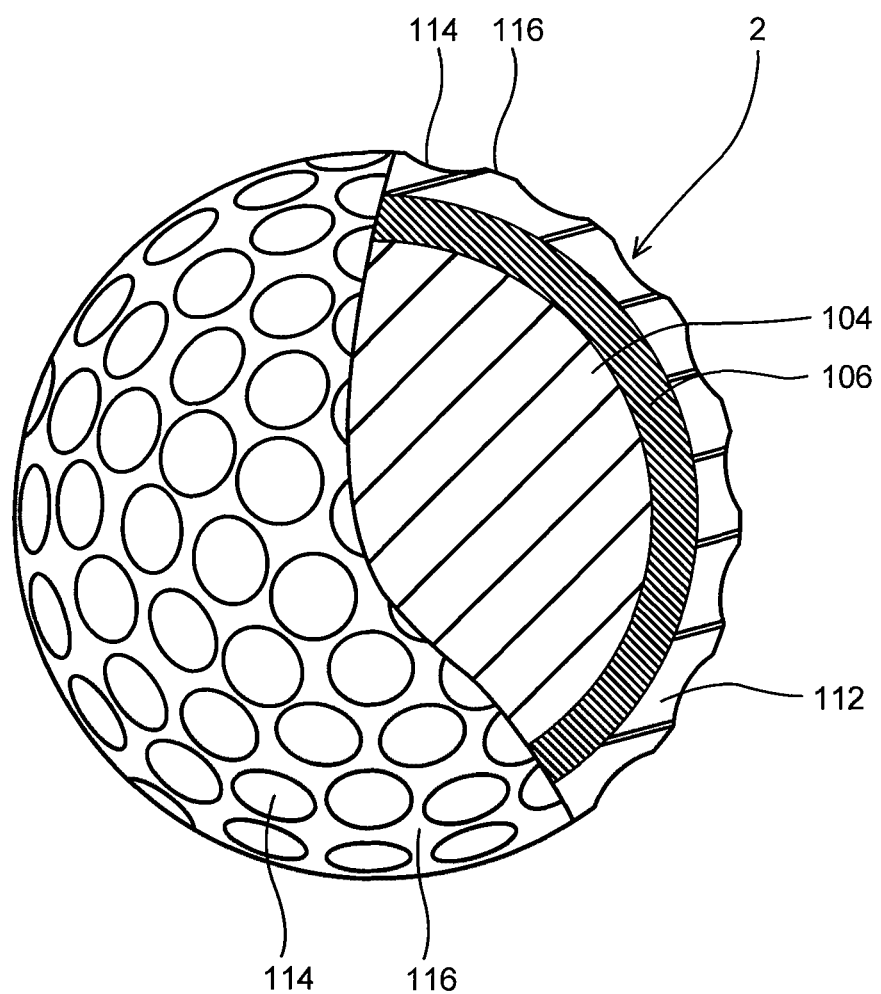

GOLF BALL

FIELD OF THE INVENTION

The present invention relates to a golf ball.

DESCRIPTION OF THE RELATED ART

Golf balls excellent in flying performance have been desired for many years. Many techniques for improving the flying performance of the golf ball have been proposed.

For example, JP 2013-248262 A discloses a golf ball including a spherical core and a cover covering the core and composed of two or more layers, wherein if the JIS-C hardness is measured in the spherical core at nine points obtained by dividing the radius of the spherical core into equal parts having 12.5% intervals therebetween, and is plotted against distance (%) from the spherical core center, the $R^2$ value of a linear approximation curve obtained from the least square method is 0.95 or higher, and a JIS-C hardness Hi of an inner most layer of the cover is equal to or less than a JIS-C hardness Hs of the core surface.

JP 2013-009916 A discloses a golf ball comprising a spherical core and a cover covering the core and composed of two or more layers, wherein the core is obtained by crosslinking a rubber composition, the rubber composition includes: (a) a base rubber; (b) a co-crosslinking agent; (c) a crosslinking initiator; and (d) a salt of carboxylic acid, the co-crosslinking agent (b) includes (b1) an α,β-unsaturated carboxylic acid having 3 to 8 carbon atoms or (b2) a metal salt of an α,β-unsaturated carboxylic acid having 3 to 8 carbon atoms, an amount of (d) the salt of the carboxylic acid is 1 part by mass or more and 40 parts by mass or less per 100 parts by mass of (a) the base rubber, and a JIS-C hardness Hi of an innermost layer of the cover is equal to or less than a JIS-C hardness Hs of the core surface.

SUMMARY OF THE INVENTION

JP2013-248262 A and JP 2013-009916 A both disclose the technique for improving flying performance and a shot feeling on driver shots, but there is still a room for further improvement. Further, it is required that the golf ball has durability for the repeated use as well.

The present invention has been achieved in view of the above circumstances, and an object of the present invention is to provide a golf ball traveling a great flight distance on driver shots and having a good shot feeling and a good durability.

The present invention provides a golf ball comprising a core, at least one intermediate layer covering the core and a cover covering the intermediate layer, wherein the core is formed from a core rubber composition containing (a) a base rubber containing a polybutadiene, (b) an α,β-unsaturated carboxylic acid having 3 to 8 carbon atoms and/or a metal salt thereof as a co-crosslinking agent, (c) a crosslinking initiator, and (d) a terpene-based resin, and a material hardness (Hm) of the intermediate layer and a material hardness (Hc) of the cover satisfy an equation of Hm≤Hc.

In the present invention, since a material hardness (Hm) of the intermediate layer and a material hardness (Hc) of the cover satisfy an equation of Hm≤Hc, the spin rate on driver shots decreases, thus the flight distance becomes great. Further, the core containing the terpene-based resin provides the good shot feeling and the good durability on driver shots.

According to the present invention, a golf ball traveling a great flight distance on driver shots and having a good shot feeling and a good durability is obtained.

BRIEF DESCRIPTION OF THE DRAWINGS

The FIGURE is a partially cutaway cross-sectional view of a golf ball according to one embodiment of the present invention.

DESCRIPTION OF THE PREFERRED EMBODIMENT

The present invention provides a golf ball comprising a core, at least one intermediate layer covering the core and a cover covering the intermediate layer, wherein the core is formed from a core rubber composition containing (a) a base rubber containing a polybutadiene, (b) an α,β-unsaturated carboxylic acid having 3 to 8 carbon atoms and/or a metal salt thereof as a co-crosslinking agent, (c) a crosslinking initiator, and (d) a terpene-based resin, and a material hardness (Hm) of the intermediate layer and a material hardness (Hc) of the cover satisfy an equation of Hm≤Hc.

First, the materials used for the core rubber composition are explained.

[(a) Base Rubber]

(a) The base rubber used for the core rubber composition according to the present invention preferably contains a polybutadiene. As the polybutadiene, a high-cis polybutadiene having a cis-1,4 bond in an amount of 90 mass % or more (hereinafter sometimes simply referred to "high-cis polybutadiene") is preferable.

The high-cis polybutadiene preferably has a 1,2-vinyl bond in an amount of 2.0 mass % or less, more preferably 1.7 mass % or less, and even more preferably 1.5 mass % or less. This is because if the amount of the 1,2-vinyl bond is excessively high, the resilience may be lowered.

The high-cis polybutadiene is preferably one synthesized using a rare-earth element catalyst. When a neodymium catalyst employing a neodymium compound which is a lanthanum series rare-earth element compound, is used, a polybutadiene rubber having a high amount of the cis-1,4 bond and a low amount of the 1,2-vinyl bond is obtained with an excellent polymerization activity, and thus such polybutadiene rubber is particularly preferred.

The polybutadiene preferably has a Mooney viscosity ($ML_{1+4}$ (100° C.)) of 30 or more, more preferably 32 or more, and even more preferably 35 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of preheating time: 1 minute, rotor rotation time: 4 minutes, and temperature: 100° C.

The polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. This is because if the molecular weight distribution (Mw/Mn) of the polybutadiene is excessively low, the processability may deteriorate, and if the molecular weight distribution (Mw/Mn) of the polybutadiene is excessively high, the resilience may be lowered. It is noted that the molecular weight distribution is measured by gel permeation chromatography ("HLC-8120GPC" available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

From the viewpoint of obtaining a core having higher resilience, the amount of the polybutadiene in the base rubber is preferably 60 mass % or more, more preferably 80 mass % or more, and even more preferably 90 mass % or more. It is also preferred that (a) the base rubber consists of the polybutadiene.

(a) The base rubber may further contain another rubber in addition to the polybutadiene rubber. Examples of another rubber include natural rubber, polyisoprene rubber, styrene polybutadiene rubber, and ethylene-propylene-diene rubber (EPDM). These rubbers may be used solely or in combination of at least two of them.

[(b) Co-Crosslinking Agent]

(b) The α,β-unsaturated carboxylic acid having 3 to 8 carbon atoms and/or the metal salt thereof used in the core rubber composition is blended as a co-crosslinking agent in the rubber composition, and has an action of crosslinking a rubber molecule by graft polymerization to a base rubber molecular chain.

Examples of the α,β-unsaturated carboxylic acid having 3 to 8 carbon atoms include acrylic acid, methacrylic acid, fumaric acid, maleic acid, and crotonic acid.

Examples of the metal constituting the metal salt of the α,β-unsaturated carboxylic acid having 3 to 8 carbon atoms include a monovalent metal ion such as sodium, potassium, and lithium; a divalent metal ion such as magnesium, calcium, zinc, barium, and cadmium; a trivalent metal ion such as aluminum; and other metal ions such as tin, and zirconium. The metal component may be used solely or as a mixture of at least two of them. Among them, as the metal component, the divalent metal such as magnesium, calcium, zinc, barium, and cadmium is preferred. This is because use of the divalent metal salt of the α,β-unsaturated carboxylic acid having 3 to 8 carbon atoms easily generates a metal crosslinking between the rubber molecules. Especially, as the divalent metal salt, zinc acrylate is preferred, because zinc acrylate enhances the resilience of the resultant golf ball. The α,β-unsaturated carboxylic acid having 3 to 8 carbon atoms and/or the metal salt thereof may be used solely or in combination of at least two of them.

The amount of (b) the α,β-unsaturated carboxylic acid having 3 to 8 carbon atoms and/or the metal salt thereof is preferably 15 parts by mass or more, more preferably 20 parts by mass or more, and even more preferably 25 parts by mass or more, and is preferably 50 parts by mass or less, more preferably 45 parts by mass or less, and even more preferably 35 parts by mass or less, with respect to 100 parts by mass of (a) the base rubber. If the amount of (b) the α,β-unsaturated carboxylic acid having 3 to 8 carbon atoms and/or the metal salt thereof is less than 15 parts by mass, the amount of (c) the crosslinking initiator which will be explained below must be increased in order to obtain an appropriate hardness of the core formed from the core rubber composition, which tends to lower the resilience of the obtained golf ball. On the other hand, if the amount of the α,β-unsaturated carboxylic acid having 3 to 8 carbon atoms and/or the metal salt thereof is more than 50 parts by mass, the core formed from the core rubber composition becomes so hard that the shot feeling of the obtained golf ball may be lowered.

[(c) Crosslinking Initiator]

(c) The crosslinking initiator used in the core rubber composition is blended in order to crosslink (a) the base rubber component. As (c) the crosslinking initiator, an organic peroxide is preferred. Specific examples of the organic peroxide include an organic peroxide such as dicumyl peroxide, 1,1-bis(t-butylperoxy)-3,3,5-trimethylcyclohexane, 2,5-dimethyl-2,5-di(t-butylperoxy)hexane, and di-t-butylperoxide. These organic peroxides may be used solely or in combination of at least two of them. Among them, dicumyl peroxide is preferably used.

The amount of (c) the crosslinking initiator is preferably 0.2 part by mass or more, more preferably 0.5 part by mass or more, and even more preferably 0.7 part by mass or more, and is preferably 5.0 parts by mass or less, more preferably 2.5 parts by mass or less, and even more preferably 2.0 parts by mass or less, with respect to 100 parts by mass of (a) the base rubber. If the amount of the crosslinking initiator is less than 0.2 part by mass, the core formed from the core rubber composition becomes so soft that the resilience of the obtained golf ball may be lowered. If the amount of (c) the crosslinking initiator is more than 5.0 parts by mass, the amount of (b) the co-crosslinking agent which has been explained above must be decreased in order to obtain an appropriate hardness of the core formed from the core rubber composition, which may lower the resilience of the obtained golf ball or worsen the durability of the obtained golf ball.

[(d) Terpene-Based Resin]

The terpene-based resin used in the present invention is not particularly limited, as long as it is a polymer having a terpene compound as a constituent component. The terpene-based resin is preferably, for example, at least one member selected from the group consisting of a terpene polymer, a terpene-phenol copolymer, a terpene-styrene copolymer, a terpene-phenol-styrene copolymer, a hydrogenated terpene-phenol copolymer, a hydrogenated terpene-styrene copolymer, and a hydrogenated terpene-phenol-styrene copolymer.

The terpene polymer is a homopolymer obtained by polymerizing a terpene compound. The terpene compound includes a hydrocarbon represented by a composition of $(C_5H_8)_n$ and an oxygen-containing derivative thereof, and is a compound having a terpene such as monoterpene $(C_{10}H_{16})$, sesquiterpene $(C_{15}H_{24})$ or diterpene $(C_{20}H_{32})$ as a basic skeleton. Examples of the terpene compound include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol. The terpene compound may be used solely or used as a mixture of two or more of them.

The terpene polymer is obtained, for example, by polymerizing the above terpene compound. Examples of the terpene polymer include α-pinene polymer, β-pinene polymer, limonene polymer, dipentene polymer, and β-pinene/limonene polymer.

The terpene-phenol copolymer (hereinafter sometimes simply referred to as "terpene phenolic resin") is, for example, a copolymer of the above terpene compound and a phenol-based compound. Examples of the phenol-based compound include phenol, cresol, xylenol, catechol, resorcin, hydroquinone, and bisphenol A. As the terpene-phenol copolymer, the copolymer of the above terpene compound and phenol is preferable.

The acid value of the terpene-phenol copolymer is preferably 10 mgKOH/g or more, more preferably 35 mgKOH/g or more, and even more preferably 60 mgKOH/g or more. In addition, the acid value of the terpene-phenol copolymer is preferably 300 mgKOH/g or less, more preferably 250 mgKOH/g or less, even more preferably 200 mgKOH/g or less, particularly preferably 150 mgKOH/g or less, and most preferably 90 mgKOH/g or less. It is noted that, in the present invention, the acid value of the terpene-phenol copolymer is an amount in milligram of potassium hydroxide required for neutralizing the acid included in one gram of the terpene-phenol copolymer, and is a value measured by a potentiometric titration method (JIS K 0070: 1992).

The hydroxy value of the terpene-phenol copolymer is preferably 30 mgKOH/g or more, more preferably 50 mgKOH/g or more. The hydroxy value of the terpene-phenol copolymer is preferably 150 mgKOH/g or less, more preferably 100 mgKOH/g or less. It is noted that, in the present specification, the hydroxy value is an amount in milligram of potassium hydroxide required for neutralizing acetic acid bonding to hydroxyl group when one gram of the resin is acetylated, and is a value measured by a potentiometric titration method (JIS K 0070: 1992).

The terpene-styrene copolymer is, for example, a copolymer of the above terpene compound and a styrene-based compound. Examples of the styrene-based compound include styrene, and α-methylstyrene. As the terpene-styrene copolymer, the copolymer of the above terpene compound and α-methylstyrene is preferable.

The terpene-phenol-styrene copolymer is, for example, a copolymer of the above terpene compound, the above phenol-based compound and the above styrene-based compound. As the terpene-phenol-styrene copolymer, the copolymer of the above terpene compound, phenol and α-methylstyrene is preferable.

The hydrogenated terpene-phenol copolymer is one obtained by hydrogenating the above terpene-phenol copolymer. The hydrogenated terpene-styrene copolymer is one obtained by hydrogenating the above terpene-styrene copolymer. The hydrogenated terpene-phenol-styrene copolymer is one obtained by hydrogenating the above terpene-phenol-styrene copolymer.

As (d) the terpene-based resin, at least one member selected from the group consisting of compounds having a structure represented by the following formulae (1) to (4) is preferable.

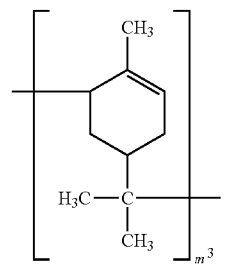

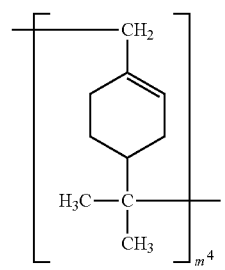

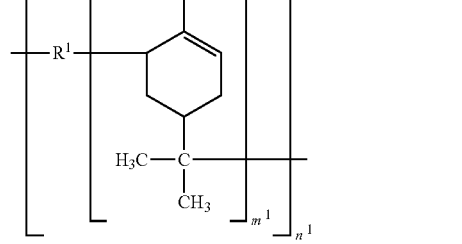

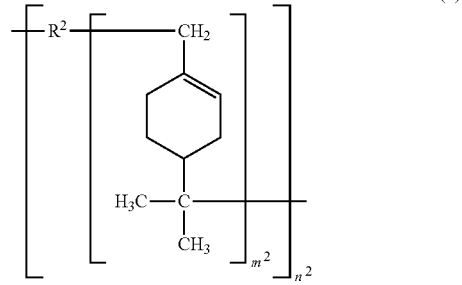

[In the formulae (1) to (4), $R^1$ and $R^2$ each independently represent a divalent residue of a phenol-based compound and/or a styrene-based compound, $m^1$ to $m^4$ each independently represent a natural number of 1 to 30, and $n^1$ to $n^2$ each independently represent a natural number of 1 to 20.]

The compounds having the structure represented by the above formulae (1) to (4) each have a structure derived from pinene in the molecule.

The compound having the structure represented by the formula (1) has a repeating unit consisting of a structural moiety derived from α-pinene and $R^1$ bonding to the structural moiety derived from α-pinene. $R^1$ is preferably a divalent residue where two hydrogen atoms are removed from benzene ring of a phenol-based compound and/or a styrene-based compound. Examples of the compound having the structure represented by the formula (1) include a copolymer of α-pinene and a phenol-based compound and/or a styrene-based compound.

Examples of the phenol-based compound include phenol, cresol, xylenol, catechol, resorcin, hydroquinone, and bisphenol A. Examples of the styrene-based compound include styrene, and α-methylstyrene.

In the formula (1), $m^1$ represents the degree of polymerization of the structural unit derived from α-pinene, and is preferably a natural number of 1 to 30. $m^1$ is preferably 1 or more, more preferably 2 or more, and even more preferably 3 or more, and is preferably 30 or less, more preferably 25 or less, and even more preferably 20 or less.

In the formula (1), $n^1$ represents the degree of polymerization of the repeating unit consisting of the structural moiety derived from α-pinene and $R^1$ bonding to the structural moiety derived from α-pinene, and is preferably a natural number of 1 to 20. $n^1$ is preferably 1 or more, more preferably 2 or more, and even more preferably 3 or more, and is preferably 20 or less, more preferably 18 or less, and even more preferably 15 or less.

The compound having the structure represented by the formula (2) has a repeating unit consisting of a structural moiety derived from β-pinene and $R^2$ bonding to the structural moiety in the molecule. Examples of the compound having the structure represented by the formula (2) include a copolymer of β-pinene and a phenol-based compound and/or a styrene-based compound. $R^2$ is a divalent residue where two hydrogen atoms are removed from benzene ring of a phenol-based compound and/or a styrene-based compound.

Examples of the phenol-based compound include phenol, cresol, xylenol, catechol, resorcin, hydroquinone, and bisphenol A. Examples of the styrene-based compound include styrene, and α-methylstyrene.

In the formula (2), $m^2$ represents the degree of polymerization of the structural unit derived from β-pinene, and is preferably a natural number of 1 to 30. $m^2$ is preferably 1 or more, more preferably 2 or more, and even more preferably 3 or more, and is preferably 30 or less, more preferably 25 or less, and even more preferably 20 or less.

In the formula (2), $n^2$ represents the degree of polymerization of the repeating unit consisting of a structural moiety derived from β-pinene and $R^2$ bonding to the structural moiety, and is preferably a natural number of 1 to 20. $n^2$ is preferably 1 or more, more preferably 2 or more, and even more preferably 3 or more, and is preferably 20 or less, more preferably 18 or less, and even more preferably 15 or less.

The compound having the structure represented by the formula (3) is a polymer having a structural unit derived from α-pinene, and is more preferably a polymer consisting of the structural unit derived from α-pinene.

In the formula (3), $m^3$ represents the degree of polymerization of the structural unit derived from α-pinene, and is preferably a natural number of 1 to 30. $m^3$ is preferably 1 or more, more preferably 2 or more, and even more preferably 3 or more, and is preferably 30 or less, more preferably 25 or less, and even more preferably 20 or less.

The compound having the structure represented by the formula (4) is a β-pinene polymer having a structural unit derived from β-pinene in the molecule, and is more preferably a polymer consisting of the structural unit derived from β-pinene.

In the formula (4), $m^4$ represents the degree of polymerization of the structural unit derived from β-pinene, and is preferably a natural number of 1 to 30. $m^4$ is preferably 1 or more, more preferably 2 or more, and even more preferably 3 or more, and is preferably 30 or less, more preferably 25 or less, and even more preferably 20 or less.

Particularly preferable examples of (d) the terpene-based resin include α-pinene-phenol copolymer, α-pinene-α-methylstyrene copolymer, α-pinene-α-methylstyrene-phenol copolymer, β-pinene-phenol copolymer, β-pinene-α-methylstyrene copolymer, and β-pinene-α-methylstyrene-phenol copolymer. As (d) the terpene-based resin, these copolymers may be used solely, or two or more of them may be used in combination.

The softening point of (d) the terpene-based resin is preferably 60° C. or more, more preferably 80° C. or more, and even more preferably 100° C. or more, and is preferably 150° C. or less, more preferably 130° C. or less, and even more preferably 120° C. or less. This is because use of (d) the terpene-based resin having the softening point falling within the above range improves the dispersibility of the resin during kneading the rubber. It is noted that the softening point of (d) the terpene-based resin is measured with a ring and ball type softening point measuring apparatus according to JIS K 6220-1: 2001, and is a temperature at which the ball drops.

As (d) the terpene-based resin, a commercial product can be used. Examples of the commercial product include Sylvares TP2019 and Sylvatraxx 6720 available from Kraton Corporation; and YS RESIN PX 1150N available from Yasuhara Chemical Co. Ltd.

The amount of (d) the terpene-based resin is preferably 0.5 part by mass or more, more preferably 0.8 part by mass or more, and even more preferably 1 part by mass or more, and is preferably 10 parts by mass or less, more preferably 8 parts by mass or less, and even more preferably 5 parts by mass or less, with respect to 100 parts by mass of (a) the base rubber. If the amount of the component (d) is less than 0.5 part by mass, the effect of adding the component (d) is small, and thus the improvement effect on the shot feeling on driver shots may not be obtained. On the other hand, if the amount of the component (d) is more than 10 parts by mass, the obtained core becomes excessively soft as a whole, and thus the resilience and travel distance on driver shots may be lowered.

The blending ratio (the component (b)/the component (d)) of the component (b) to the component (d) is preferably 2.0 or more, more preferably 3.0 or more, and even more preferably 5.0 or more, and is preferably 40.0 or less, more preferably 38.0 or less, even more preferably 35.0 or less in a mass ratio. If the blending ratio (the component (b)/the component (d)) of the component (b) to the component (d) falls within the above range, the obtained golf ball has better shot feeling and travel distance on driver shots.

[(e) Organic Sulfur Compound]

The core rubber composition preferably further contains (e) an organic sulfur compound. If (e) the organic sulfur compound is contained, the obtained core has higher resilience.

As (e) the organic sulfur compound, at least one compound selected from the group consisting of thiols (thiophenols and thionaphthols), polysulfides, thiurams, thiocarboxylic acids, dithiocarboxylic acids, sulfenamides, dithiocarbamates and thiazoles is preferable.

Examples of the thiols include thiophenols and thionaphthols. Examples of the thiophenols include thiophenol; thiophenols substituted with a fluoro group, such as 4-fluorothiophenol, 2,4-difluorothiophenol, 2,5-difluorothiophenol, 2,6-difluorothiophenol, 2,4,5-trifluorothiophenol, and 2,4,5,6-tetrafluorothiophenol, pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, and pentachlorothiophenol; thiophenols substituted with a bromo group, such as 4-bromothiophenol, 2,4-dibromothiophenol, 2,5-dibromothiophenol, 2,6-dibromothiophenol, 2,4,5-tribromothiophenol, 2,4,5,6-tetrabromothiophenol, and pentabromothiophenol; thiophenols substituted with an iodo group, such as 4-iodothiophenol, 2,4-diiodothiophenol, 2,5-diiodothiophenol, 2,6-diiodothiophenol, 2,4,5-triiodothiophenol, and 2,4,5,6-tetraiodothiophenol, pentaiodothiophenol; and metal salts thereof. As the metal salt, a zinc salt is preferred.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and a metal salt thereof. Preferable examples include 2-thionaphthol, 1-thionaphthol, and a metal salt thereof. The metal salt is preferably a divalent metal salt, more preferably a zinc salt. Specific examples of the metal salt include the zinc salt of 1-thionaphthol and the zinc salt of 2-thionaphthol.

The polysulfides are organic sulfur compounds having a polysulfide bond, and examples thereof include disulfides, trisulfides, and tetrasulfides. As the polysulfides, diphenylpolysulfides are preferable.

Examples of the diphenylpolysulfides include diphenyldisulfide; diphenyldisulfides substituted with a halogen group, such as bis(4-fluorophenyl)disulfide, bis(2,5-difluorophenyl)disulfide, bis(2,6-difluorophenyl)disulfide, bis(2,4,5-trifluorophenyl)disulfide, bis(2,4,5,6-tetrafluorophenyl) disulfide, bis(pentafluorophenyl)disulfide, bis(4-chlorophenyl)disulfide, bis(2,5-dichlorophenyl)disulfide, bis(2,6-dichlorophenyl)disulfide, bis(2,4,5-trichlorophenyl) disulfide, bis(2,4,5,6-tetrachlorophenyl)disulfide, bis(pentachlorophenyl)disulfide, bis(4-bromophenyl)disulfide, bis (2,5-dibromophenyl)disulfide, bis(2,6-dibromophenyl) disulfide, bis(2,4,5-tribromophenyl)disulfide, bis(2,4,5,6-tetrabromophenyl)disulfide, bis(pentabromophenyl) disulfide, bis(4-iodophenyl)disulfide, bis(2,5-diiodophenyl) disulfide, bis(2,6-diiodophenyl)disulfide, bis(2,4,5-triiodophenyl)disulfide, bis(2,4,5,6-tetraiodophenyl) disulfide, and bis(pentaiodophenyl)disulfide; and diphenyldisulfides substituted with an alkyl group, such as bis(4-methylphenyl)disulfide, bis(2,4,5-trimethylphenyl) disulfide, bis(pentamethylphenyl)disulfide, bis(4-t-butylphenyl)disulfide, bis(2,4,5-tri-t-butylphenyl)disulfide, and bis(penta-t-butylphenyl)disulfide.

Examples of the thiurams include thiuram monosulfides such as tetramethylthiuram monosulfide; thiuram disulfides such as tetramethylthiuram disulfide, tetraethylthiuram disulfide, and tetrabutylthiuram disulfide; and thiuram tetrasulfides such as dipentamethylenethiuram tetrasulfide. Examples of the thiocarboxylic acids include a naphthalene thiocarboxylic acid. Examples of the dithiocarboxylic acids include a naphthalene dithiocarboxylic acid. Examples of the sulfenamides include N-cyclohexyl-2-benzothiazole sulfenamide, N-oxydiethylene-2-benzothiazole sulfenamide, and N-t-butyl-2-benzothiazole sulfenamide.

(e) The organic sulfur compound is preferably thiophenols and/or the metal salt thereof, thionaphthols and/or the metal salt thereof, diphenyldisulfides, and thiuramdisulfides, more preferably 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyldisulfide, bis(2,6-difluorophenyl)disulfide, bis(2,6-dichlorophenyl)disulfide, bis(2,6-dibromophenyl)disulfide, bis(2,6-diiodophenyl)disulfide, and bis(pentabromophenyl) disulfide.

(e) The organic sulfur compound may be used solely or in combination of at least two of them.

The amount of (e) the organic sulfur compound is preferably 0.05 part by mass or more, more preferably 0.1 part by mass or more, and even more preferably 0.2 part by mass or more, and is preferably 5.0 parts by mass or less, more preferably 3.0 parts by mass or less, and even more preferably 2.0 parts by mass or less, with respect to 100 parts by mass of (a) the base rubber. If the amount of (e) the organic sulfur compound is less than 0.05 part by mass, the effect of adding (e) the organic sulfur compound may not be obtained, and thus the resilience of the golf ball may not be improved. In addition, if the amount of (e) the organic sulfur compound is more than 5.0 parts by mass, the obtained golf ball may have an excessively large compression deformation amount, and thus the resilience thereof may be lowered.

[(f) Metal Compound]

In the case that the core rubber composition contains only the α,β-unsaturated carboxylic acid having 3 to 8 carbon atoms as the co-crosslinking agent, the core rubber composition preferably further contains (f) a metal compound. This is because neutralizing the α,β-unsaturated carboxylic acid having 3 to 8 carbon atoms with the metal compound in the core rubber composition provides substantially the same effect as using the metal salt of the α,β-unsaturated carboxylic acid having 3 to 8 carbon atoms as the co-crosslinking agent. It is noted that in case of using the α,β-unsaturated carboxylic acid having 3 to 8 carbon atoms and the metal salt thereof in combination as the co-crosslinking agent, (f) the metal compound may be used as an optional component.

(f) The metal compound is not particularly limited as long as it neutralizes (b) the α,β-unsaturated carboxylic acid having 3 to 8 carbon atoms in the core rubber composition. Examples of (f) the metal compound include a metal hydroxide such as magnesium hydroxide, zinc hydroxide, calcium hydroxide, sodium hydroxide, lithium hydroxide, potassium hydroxide, and copper hydroxide; a metal oxide such as magnesium oxide, calcium oxide, zinc oxide, and copper oxide; and a metal carbonate such as magnesium carbonate, zinc carbonate, calcium carbonate, sodium carbonate, lithium carbonate, and potassium carbonate. (f) The metal compound is preferably a divalent metal compound, more preferably a zinc compound. This is because the divalent metal compound reacts with the α,β-unsaturated carboxylic acid having 3 to 8 carbon atoms, thereby forming a metal crosslinking. Further, use of the zinc compound provides a golf ball with higher resilience.

(f) The metal compound may be used solely or in combination of two or more of them. In addition, the amount of (f) the metal compound may be appropriately adjusted in accordance with the desired neutralization degree of (b) the α,β-unsaturated carboxylic acid having 3 to 8 carbon atoms.

The core rubber composition used in the present invention may further contain additives such as a pigment, a filler for adjusting a weight or the like, an antioxidant, a peptizing agent, a softening agent or the like, where necessary.

The filler blended in the core rubber composition is used as a weight adjusting agent for mainly adjusting the weight of the golf ball obtained as a final product. The filler may be blended where necessary. Examples of the filler include an inorganic filler such as zinc oxide, barium sulfate, calcium carbonate, magnesium oxide, tungsten powder, and molybdenum powder. Zinc oxide is particularly preferably used as the filler. It is considered that zinc oxide functions as a vulcanization activator and increases the hardness of the entire core. The amount of the filler is preferably 0.5 part by mass or more, more preferably 1 part by mass or more, and is preferably 30 parts by mass or less, more preferably 25 parts by mass or less, and even more preferably 20 parts by mass or less, with respect to 100 parts by mass of (a) the base rubber. This is because if the amount of the filler is less than 0.5 part by mass, it is difficult to adjust the weight, while if the amount of the filler exceeds 30 parts by mass, the weight ratio of the rubber component is reduced and thus the resilience tends to be lowered.

The amount of the antioxidant is preferably 0.1 part by mass or more and 1 part by mass or less with respect to 100 parts by mass of (a) the base rubber. In addition, the amount of the peptizing agent is preferably 0.1 part by mass or more and 5 parts by mass or less with respect to 100 parts by mass of (a) the base rubber.

[Core]

The core of the golf ball according to the present invention can be obtained by mixing and kneading the above-described core rubber composition, and molding the kneaded product in a mold. The molding condition is not particularly limited, and the molding is generally carried out at a temperature in a range from 130° C. to 200° C. under a pressure of 2.9 MPa to 11.8 MPa for 10 minutes to 60 minutes. For example, it is preferred that the core rubber composition is heated at a temperature in a range from 130° C. to 200° C. for 10 to 60 minutes, or alternatively the core rubber composition is subjected to a two-step heating, i.e. the core rubber composition is heated at a temperature in a range from 130° C. to 150° C. for 20 to 40 minutes and then heated at a temperature in a range from 160° C. to 180° C. for 5 to 15 minutes.

The core preferably has a spherical shape. The construction of the core includes a single layered structure or a multi-layered structure, preferably includes a single layered structure. Unlike the multi-layered structure, the spherical core of the single layered structure does not have an energy loss at the interface of the multi-layered structure when hitting, and thus has an enhanced resilience.

The surface hardness (Hs) of the core of the golf ball according to the present invention is preferably 60 or more, more preferably 65 or more, even more preferably 70 or more, and is preferably 85 or less, more preferably 82 or less, and even more preferably 80 or less in Shore C hardness. If the surface hardness (Hs) of the core is 60 or more in Shore C hardness, the resilience of the core is better. In addition, if the surface hardness (Hs) of the core is 85 or less in Shore C hardness, the durability is better.

The center hardness (Ho) of the core is preferably 40 or more, more preferably 50 or more, and even more preferably 60 or more in Shore C hardness. If the center hardness (Ho) of the core is 40 or more in Shore C hardness, the core does not become excessively soft, and thus the resilience is better. In addition, the center hardness (Ho) of the core is preferably 75 or less, more preferably 70 or less, and even more preferably 68 or less in Shore C hardness. If the center hardness (Ho) is 75 or less in Shore C hardness, the core does not become excessively hard, and thus the shot feeling is better on driver shots.

The hardness difference (Hs−Ho) between the surface hardness (Hs) of the core and the center hardness (Ho) of the core is preferably 5 or more, more preferably 6 or more, and even more preferably 8 or more, and is preferably 35 or less, more preferably 25 or less, and even more preferably 20 or less in Shore C hardness. If the hardness difference (Hs−Ho) between the surface hardness (Hs) of the core and the center hardness (Ho) of the core is 5 or more in Shore C hardness, the obtained golf ball has better resilience. In addition, if the hardness difference (Hs−Ho) between the surface hardness (Hs) of the core and the center hardness (Ho) of the core is 35 or less in Shore C hardness, the durability is better.

The core of the golf ball according to the present invention preferably has a diameter of 34.8 mm or more, more preferably 36.8 mm or more, and even more preferably 38.6 mm or more, and preferably has a diameter of 42.2 mm or less, more preferably 41.8 mm or less, even more preferably 41.2 mm or less, and most preferably 40.8 mm or less. If the core has a diameter of 34.8 mm or more, the thickness of the intermediate layer and the cover does not become too thick and thus the resilience becomes better. On the other hand, if the core has a diameter of 42.2 mm or less, the thickness of the intermediate layer and the cover does not become too thin and thus the intermediate layer and the cover function better.

When the core has a diameter in a range from 34.8 mm to 42.2 mm, the compression deformation amount of the core (shrinking amount of the core along the compression direction) when applying a load from an initial load of 98 N to a final load of 1275 N is preferably 3.0 mm or more, more preferably 3.5 mm or more, and even more preferably 3.8 mm or more, and is preferably 6.0 mm or less, more preferably 5.0 mm or less, and even more preferably 4.5 mm or less. If the compression deformation amount is 3.0 mm or more, the shot feeling becomes better and if the compression deformation amount is 6.0 mm or less, the resilience becomes better.

[Intermediate Layer]

The golf ball according to the present invention comprises a core, and at least one intermediate layer covering the core. The intermediate layer comprises at least one layer, and thus may be composed of a single layer or at least two layers.

In the present invention, the material hardness (Hm) of the intermediate layer and the material hardness (Hc) of the cover satisfy an equation of Hm≤Hc. If the material hardness (Hm) of the intermediate layer and the material hardness (Hc) of the cover satisfy the above equation, the lower spin rate on driver shots has been achieved, and the golf ball having an improved flight performance is obtained. In case of multiple intermediate layers, the material hardness (Hm) of the hardest intermediate layer and the material hardness (Hc) of the cover satisfy the above equation.

The hardness difference (Hc−Hm) between the material hardness (Hc) of the cover and the material hardness (Hm) of the intermediate layer is preferably 15 or more, more preferably 18 or more, even more preferably 20 or more in Shore D hardness. If the hardness difference (Hc−Hm) is 15 or more in Shore D hardness, the spin rate on driver shots is lowered, resulting in a great flight distance on driver shots. The upper limit of the hardness difference (Hc−Hm) is, but not particularly limited to, preferably 35, more preferably 33, even more preferably 32 in Shore D hardness. If the hardness difference (Hc−Hm) is more than 35 in Shore D hardness, the durability of the golf ball may be lowered.

The material hardness (Hm) of the intermediate layer is preferably 60 or less, more preferably 50 or less, even more preferably 45 or less in Shore D hardness. If the material hardness (Hm) of the intermediate layer is more than 60 in Shore D hardness, the effect of the lower spin rate and the effect of improving the durability on driver shots are hardly obtained, and the sufficient flight distance and the durability are not obtained. The lower limit of the hardness (Hm) of the intermediate layer is, but not particularly limited to, preferably 25, more preferably 28, even more preferably 30 in Shore D hardness. The material hardness (Hm) of the intermediate layer is a slab hardness of the intermediate layer composition for forming the intermediate layer molded into a sheet shape. In case of multiple intermediate layers, the material hardness of the intermediate layer composition constituting each layer may be identical to or different from each other, but it is preferable that the material hardness of all the intermediate layers falls within the above range.

The thickness of the intermediate layer is preferably 2.0 mm or less, more preferably 1.9 mm or less, even more preferably 1.8 mm or less. If the thickness of the intermediate layer is more than 2.0 mm, the shot feeling on driver shots may become bad. The thickness of the intermediate layer is preferably 0.5 mm or more, more preferably 0.6 mm or more, even more preferably 0.7 mm or more. If the thickness of the intermediate layer is less than 0.5 mm, the durability of the golf ball may be lowered, or the molding of the intermediate layer may become difficult. In case of multiple intermediate layers, the thickness of each intermediate layer may be equal to or different from the thickness of the other intermediate layer, as long as a total thickness of all the intermediate layers falls within the above range.

[Cover]

The golf ball according to the present invention comprises a cover covering the at least one intermediate layer. The cover constitutes an outermost layer of the golf ball body except a paint film. In the present invention, the material hardness (Hc) of the cover of the golf ball is preferably 50 or more, more preferably 55 or more, even more preferably 57 or more, and is preferably 75 or less, more preferably 73 or less, even more preferably 70 or less in Shore D hardness. If the material hardness (Hc) of the cover is less 50 in Shore D hardness, the resilience performance on driver shots may be lowered, and thus, the sufficient flight distance may not be obtained. On the other hand, if the material hardness (Hc) of the cover is more than 75 in Shore D hardness, the shot feeling on driver shots may be lowered. The material hardness (Hc) of the cover is a slab hardness of the cover composition for forming the cover molded into a sheet shape.

The thickness of the cove is preferably 2.0 mm or less, more preferably 1.9 mm or less, even more preferably 1.8 mm or less. If the thickness of the cover is more than 2.0 mm, the shot feeling on driver shots may be lowered. The thickness of the cover is preferably 0.5 mm or more, more preferably 0.6 mm or more, even more preferably 0.7 mm or more. If the thickness of the cover is less than 0.5 mm, the durability of the golf ball may be lowered, or the molding of the cover may become difficult.

The total thickness of the intermediate layer and the cover is preferably 3.6 mm or less, more preferably 3.5 mm or less, even more preferably 3.4 mm or less. If the total thickness of the intermediate layer and the cover is more than 3.6 mm, the shot feeling on driver shots may be lowered.

[Materials for the Intermediate Layer and the Cover]

In one embodiment of the present invention, the intermediate layer and the cover of the golf ball are formed from a composition containing a resin component. The resin component includes a thermoplastic resin or thermosetting resin, preferably includes the thermoplastic resin. In the present invention, a resin composition for forming an intermediate layer is sometimes referred to as "intermediate layer composition" and a resin composition for forming a cover is sometimes referred to as "cover composition."

Examples of the thermoplastic resin include an ionomer resin, a thermoplastic olefin copolymer, a thermoplastic urethane resin, a thermoplastic polyamide resin, a thermoplastic styrene-based resin, a thermoplastic polyester resin, and a thermoplastic acrylic resin. Among these thermoplastic resins, a thermoplastic elastomer having rubber elasticity is preferable. Examples of the thermoplastic elastomer include a thermoplastic polyurethane elastomer, a thermoplastic polyamide elastomer, a thermoplastic styrene-based elastomer, a thermoplastic polyester elastomer, and a thermoplastic acrylic-based elastomer.

[Ionomer Resin]

Examples of the ionomer resin include an ionomer resin consisting of a metal ion-neutralized product of a binary copolymer composed of an olefin and an α,β-unsaturated carboxylic acid having 3 to 8 carbon atoms; an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester; and a mixture thereof.

It is noted that, in the present invention, "an ionomer resin consisting of a metal ion-neutralized product of a binary copolymer composed of an olefin and an α,β-unsaturated carboxylic acid having 3 to 8 carbon atoms" is sometimes simply referred to as "a binary ionomer resin", and "an ionomer resin consisting of a metal ion-neutralized product of a ternary copolymer composed of an olefin, an α,β-unsaturated carboxylic acid having 3 to 8 carbon atoms and an α,β-unsaturated carboxylic acid ester" is sometimes simply referred to as "a ternary ionomer resin".

The olefin is preferably an olefin having 2 to 8 carbon atoms. Examples of the olefin include ethylene, propylene, butene, pentene, hexene, heptene and octene, and ethylene is particularly preferable. Examples of the α,β-unsaturated carboxylic acid having 3 to 8 carbon atoms include acrylic acid, methacrylic acid, fumaric acid, maleic acid and crotonic acid, and acrylic acid or methacrylic acid is particularly preferable. In addition, as the α,β-unsaturated carboxylic acid ester, methyl ester, ethyl ester, propyl ester, n-butyl ester, isobutyl ester or the like of acrylic acid, methacrylic acid, fumaric acid, maleic acid or the like can be used, and acrylic acid ester or methacrylic acid ester is particularly preferable.

As the binary ionomer resin, a metal ion-neutralized product of an ethylene-(meth)acrylic acid binary copolymer is preferable. As the ternary ionomer resin, a metal ion-neutralized product of a ternary copolymer composed of ethylene, (meth)acrylic acid and (meth)acrylic acid ester is preferable. Herein, (meth)acrylic acid means acrylic acid and/or methacrylic acid.

The amount of the α,β-unsaturated carboxylic acid component having 3 to 8 carbon atoms in the binary ionomer resin is preferably 15 mass % or more, more preferably 16 mass % or more, and even more preferably 17 mass % or more, and is preferably 30 mass % or less, more preferably 25 mass % or less. If the amount of the α,β-unsaturated carboxylic acid component having 3 to 8 carbon atoms is 15 mass % or more, the obtained constituent member is easily adjusted to a desired hardness. In addition, if the amount of the α,β-unsaturated carboxylic acid component having 3 to 8 carbon atoms is 30 mass % or less, the obtained constituent member is not excessively hard and hence has better durability and shot feeling.

The neutralization degree of the carboxyl groups of the binary ionomer resin is preferably 15 mole % or more, more preferably 20 mole % or more, and is preferably 100 mole % or less. If the neutralization degree is 15 mole % or more, the obtained golf ball has better resilience and durability. It is noted that the neutralization degree of the carboxyl groups of the binary ionomer resin may be calculated by the following expression. In addition, the metal component may be contained in such a manner that the theoretical neutralization degree of the carboxyl groups of the ionomer resin exceeds 100 mole %.

Neutralization degree of binary ionomer resin (mole %)=100×(mole number of neutralized carboxyl groups in binary ionomer resin/mole number of all carboxyl groups in binary ionomer resin)

Examples of the metal ion for neutralizing at least a part of carboxyl groups of the binary ionomer resin include a monovalent metal ion such as sodium, potassium and lithium; a divalent metal ion such as magnesium, calcium, zinc, barium and cadmium; a trivalent metal ion such as aluminum; and other ion such as tin and zirconium.

Specific examples of the binary ionomer resin in terms of trade names include "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), Himilan AM7329 (Zn)" available from Mitsui-Du Pont Polychemicals Co., Ltd.

Specific examples of the binary ionomer resin in terms of trade names further include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li))" available from E.I. du Pont de Nemours and Company.

Examples of the ionomer resin available from ExxonMobil Chemical Corporation include "Iotek (registered trademark) (e.g. Iotek 8000 (Na), Iotek 8030 (Na), Iotek 7010 (Zn), Iotek 7030 (Zn))".

The above listed binary ionomer resins may be used solely or as a mixture of two or more of them. Na, Zn, Li, Mg and the like described in the parentheses after the trade names indicate metal types of neutralizing metal ions of the ionomer resins.

The amount of the α,β-unsaturated carboxylic acid component having 3 to 8 carbon atoms in the ternary ionomer resin is preferably 2 mass % or more, more preferably 3 mass % or more, and is preferably 30 mass % or less, more preferably 25 mass % or less.

The neutralization degree of the carboxyl groups of the ternary ionomer resin is preferably 20 mole % or more, more preferably 30 mole % or more, and is preferably 100 mole % or less. If the neutralization degree is 20 mole % or more, the golf ball obtained by using the thermoplastic resin composition has better resilience and durability. It is noted that the neutralization degree of the carboxyl groups of the ionomer resin may be calculated by the following expression. In addition, the metal component may be contained in such a manner that the theoretical neutralization degree of the carboxyl groups of the ionomer resin exceeds 100 mole %.

Neutralization degree of ionomer resin (mole %)=100× (mole number of neutralized carboxyl groups in ionomer resin/mole number of all carboxyl groups in ionomer resin)

Examples of the metal ion for neutralizing at least a part of carboxyl groups of the ternary ionomer resin include a monovalent metal ion such as sodium, potassium and lithium; a divalent metal ion such as magnesium, calcium, zinc, barium and cadmium; a trivalent metal ion such as aluminum; and other ion such as tin and zirconium.

Specific examples of the ternary ionomer resin in terms of trade names include "Himilan (e.g. Himilan AM7327 (Zn), Himilan 1855 (Zn), Himilan 1856 (Na), Himilan AM7331 (Na))" available from Mitsui-Du Pont Polychemicals Co., Ltd. Further, examples of the ternary ionomer resin available from E.I. du Pont de Nemours and Company include "Surlyn 6320 (Mg), Surlyn 8120 (Na), Surlyn 8320 (Na), Surlyn 9320 (Zn), Surlyn 9320W (Zn), HPF1000 (Mg), HPF2000 (Mg), etc.)". In addition, Examples of the ternary ionomer resin available from ExxonMobil Chemical Corporation include "Iotek 7510 (Zn), Iotek 7520 (Zn), etc.)". It is noted that Na, Zn, Mg and the like described in the parentheses after the trade names indicate types of neutralizing metal ions. The ternary ionomer resin may be used solely, or two or more of them may be used in combination.

[Thermoplastic Olefin Copolymer]

Examples of the thermoplastic olefin copolymer include a binary copolymer composed of an olefin and an α,β-unsaturated carboxylic acid having 3 to 8 carbon atoms; a ternary copolymer composed of an olefin, an α,β-unsaturated carboxylic acid having 3 to 8 carbon atoms and an α,β-unsaturated carboxylic acid ester; and a mixture thereof. The thermoplastic olefin copolymer is a non-ionic copolymer in which the carboxylic groups thereof are not neutralized.

It is noted that, in the present invention, "a binary copolymer composed of an olefin and an α,β-unsaturated carboxylic acid having 3 to 8 carbon atoms" is sometimes simply referred to as "a binary copolymer", and "a ternary copolymer composed of an olefin, an α,β-unsaturated carboxylic acid having 3 to 8 carbon atoms and an α,β-unsaturated carboxylic acid ester" is sometimes simply referred to as "a ternary copolymer".

Examples of the olefin include those listed as the olefin constituting the ionomer resin. In particular, the olefin is preferably ethylene. Examples of the α,β-unsaturated carboxylic acid having 3 to 8 carbon atoms and the ester thereof include those listed as the α,β-unsaturated carboxylic acid having 3 to 8 carbon atoms and the ester thereof constituting the ionomer resin.

As the binary copolymer, a binary copolymer composed of ethylene and (meth)acrylic acid is preferable. As the ternary copolymer, a ternary copolymer composed of ethylene, (meth)acrylic acid and (meth)acrylic acid ester is preferable. Herein, (meth)acrylic acid means acrylic acid and/or methacrylic acid.

The amount of the α,β-unsaturated carboxylic acid component having 3 to 8 carbon atoms in the binary copolymer or ternary copolymer is preferably 4 mass % or more, more preferably 5 mass % or more, and is preferably 30 mass % or less, more preferably 25 mass % or less.

Specific examples of the binary copolymer in terms of trade names include an ethylene-methacrylic acid copolymer in a trade name of "NUCREL (registered trademark) (e.g. "NUCREL N1050H", "NUCREL N2050H", "NUCREL N1110H", "NUCREL N0200H")" available from Mitsui-Du Pont Polychemicals Co., Ltd.; and an ethylene-acrylic acid copolymer in a trade name of "PRIMACOR (registered trademark) 59801" available from Dow Chemical Corporation.

Specific examples of the ternary copolymer in terms of trade names include trade name "NUCREL (e.g. "NUCREL AN4318" "NUCREL AN4319")" available from Mitsui-Du Pont Polychemicals Co., Ltd.; trade name "NUCREL (e.g. "NUCREL AE")" available from E.I. du Pont de Nemours and Company; and trade name "PRIMACOR (e.g. "PRIMACOR AT310", "PRIMACOR AT320")" available from Dow Chemical Corporation. The binary copolymer or ternary copolymer may be used solely, or two or more of them may be used in combination.

[Thermoplastic Polyurethane Resin and Thermoplastic Polyurethane Elastomer]

Examples of the thermoplastic polyurethane resin and the thermoplastic polyurethane elastomer include a thermoplastic resin and a thermoplastic elastomer which have a plurality of urethane bonds in the main chain of the molecule. As the polyurethane, a product obtained by a reaction between a polyisocyanate component and a polyol component is preferable. Examples of the thermoplastic polyurethane elastomer include trade names "Elastollan (registered trademark) XNY85A", "Elastollan XNY90A", "Elastollan XNY97A", "Elastollan ET885" and "Elastollan ET890" available from BASF Japan Ltd.

[Thermoplastic Styrene-Based Elastomer]

As the thermoplastic styrene-based elastomer, a thermoplastic elastomer containing a styrene block is suitably used. The styrene block-containing thermoplastic elastomer has a polystyrene block which is a hard segment, and a soft segment. The typical soft segment is a diene block. Examples of the constituent component of the diene block include butadiene, isoprene, 1,3-pentadiene and 2,3-dimethyl-1,3-butadiene. Butadiene and isoprene are preferable. Two or more of the constituent components may be used in combination.

Examples of the thermoplastic elastomer containing the styrene block include a styrene-butadiene-styrene block copolymer (SBS), a styrene-isoprene-styrene block copolymer (SIS), a styrene-isoprene-butadiene-styrene block copolymer (SIBS), a hydrogenated product of SBS, a hydrogenated product of SIS, and a hydrogenated product of SIBS. Examples of the hydrogenated product of SBS include a styrene-ethylene-butylene-styrene block copolymer (SEBS). Examples of the hydrogenated product of SIS include a styrene-ethylene-propylene-styrene block copolymer (SEPS). Examples of the hydrogenated product of SIBS include a styrene-ethylene-ethylene-propylene-styrene block copolymer (SEEPS).

The amount of the styrene component in the thermoplastic elastomer containing the styrene block is preferably 10 mass % or more, more preferably 12 mass % or more, and most preferably 15 mass % or more. From the viewpoint of the shot feeling of the obtained golf ball, the above amount is preferably 50 mass % or less, more preferably 47 mass % or less, and most preferably 45 mass % or less.

Examples of the thermoplastic elastomer containing the styrene block include an alloy of one member or at least two members selected from the group consisting of SBS, SIS, SIBS, SEBS, SEPS, SEEPS and hydrogenated products thereof with a polyolefin. It is estimated that the olefin component in the alloy contributes to the improvement in compatibility with the ionomer resin. If the alloy is used, the resilience performance of the golf ball is enhanced. An olefin having 2 to 10 carbon atoms is preferably used. Suitable examples of the olefin include ethylene, propylene, butene and pentene. Ethylene and propylene are particularly preferable.

Specific examples of the polymer alloy include "TEFABLOC (registered trademark) T3221C", "TEFABLOC T33390", "TEFABLOC SJ4400N", "TEFABLOC SJ5400N", "TEFABLOC SJ6400N", "TEFABLOC SJ7400N", "TEFABLOC SJ8400N", "TEFABLOC SJ9400N" and "TEFABLOC SR04" available from Mitsubishi Chemical Corporation. Other specific examples of the thermoplastic elastomer containing the styrene block include "Epofriend A1010" available from Daicel Chemical Industry Co., Ltd., and "SEPTON HG-252" available from Kuraray Co., Ltd.

[Thermoplastic Polyamide Resin and Thermoplastic Polyamide Elastomer]

The thermoplastic polyamide is not particularly limited as long as it is a thermoplastic resin having a plurality of amide bonds (—NH—CO—) in the main chain of the molecule, and examples thereof include a product having amide bonds formed in the molecule through ring-opening polymerization of a lactam, or a reaction between a diamine component and a dicarboxylic acid component.

Examples of the polyamide resin include an aliphatic polyamide such as polyamide 6, polyamide 11, polyamide 12, polyamide 66, polyamide 610, polyamide 6T, polyamide 6I, polyamide 9T, polyamide M5T and polyamide 612; an aromatic polyamide such as poly-p-phenylene terephthalamide and poly-m-phenylene isophthalamide. These polyamides may be used solely, or two or more of them may be used in combination. Among them, the aliphatic polyamide such as polyamide 6, polyamide 66, polyamide 11 and polyamide 12 is preferable.

Specific examples of the polyamide resin in terms of trade names include "Rilsan (registered trademark) B (e.g. Rilsan BESN TL, Rilsan BESN P20 TL, Rilsan BESN P40 TL, Rilsan MB3610, Rilsan BMF O, Rilsan BMN O, Rilsan BMN O TLD, Rilsan BMN BK TLD, Rilsan BMN P20 D, Rilsan BMN P40 D)" available from Arkema K.K.

The polyamide elastomer has a hard segment portion composed of a polyamide component, and a soft segment portion. Examples of the soft segment portion of the polyamide elastomer include a polyether ester component and a polyether component. Examples of the polyamide elastomer include a polyether ester amide obtained by a reaction between a polyamide component (hard segment component) and a polyether ester component (soft segment component) which is formed from a polyoxyalkylene glycol and a dicarboxylic acid; and a polyether amide obtained by a reaction between a polyamide component (hard segment component) and a polyether component (soft segment component) which is formed from a dicarboxylic acid or diamine and a compound obtained by aminating or carboxylating both terminals of a polyoxyalkylene glycol.

Examples of the polyamide elastomer include "PEBAX (registered trademark) 2533", "PEBAX 3533", "PEBAX 4033" and "PEBAX 5533" available from Arkema K.K.

[Thermoplastic Polyester Resin and Thermoplastic Polyester Elastomer]

The thermoplastic polyester resin is not particularly limited as long as it has a plurality of ester bonds in the main chain of the molecule, and preferable examples thereof include a product obtained by a reaction between a dicarboxylic acid and a diol. Examples of the thermoplastic polyester elastomer include a block copolymer having a hard segment composed of a polyester component, and a soft segment. Examples of the polyester component constituting the hard segment include an aromatic polyester. Examples of the soft segment component include an aliphatic polyether and an aliphatic polyester.

Specific examples of the polyester elastomer include "Hytrel (registered trademark) 3548" and "Hytrel 4047" available from Du Pont-Toray Co., Ltd., and "Primalloy (registered trademark) A1606", "Primalloy B1600" and "Primalloy B1700" available from Mitsubishi Chemical Corporation.

[Thermoplastic (Meth)Acrylic-Based Elastomer]

Examples of the thermoplastic (meth)acrylic-based elastomer include a thermoplastic elastomer obtained by copolymerizing ethylene and (meth)acrylic acid ester. Specific examples of the thermoplastic (meth)acrylic-based elastomer include "KURARITY (a block copolymer of methyl methacrylate and butyl acrylate)" available from Kuraray Co., Ltd.

The intermediate layer composition and the cover composition preferably contain an ionomer resin as a resin component. The intermediate layer composition and the cover composition may consist of an ionomer resin, or may further contain another resin in addition to the ionomer resin.

The intermediate layer composition and the cover composition may further contain additives. Examples of the additives include a pigment component such as a white pigment (e.g. titanium oxide) and a blue pigment, a weight adjusting agent, a dispersant, an antioxidant, an ultraviolet absorber, a light stabilizer, a fluorescent material or fluorescent brightener. Examples of the weight adjusting agent include inorganic fillers such as zinc oxide, barium sulfate, calcium carbonate, magnesium oxide, tungsten powder, and molybdenum powder.

The amount of the white pigment (e.g. titanium oxide) in the cover composition is preferably 0.5 part by mass or more, more preferably 1 part by mass or more, and is preferably 10 parts by mass or less, more preferably 8 parts by mass or less, with respect to 100 parts by mass of the resin component constituting the cover. This is because if the amount of the white pigment is 0.5 part by mass or more, it is possible to impart the opacity to the cover, and if the amount of the white pigment is more than 10 parts by mass, the durability of the obtained cover may deteriorate.

Examples of the method for molding the intermediate layer of the golf ball of the present invention include a method which comprises molding the intermediate layer composition into a half hollow-shell, covering the spherical body with two of the half shells, and subjecting the spherical body with two of the half hollow-shells to the compression molding; and a method which comprises injection molding the intermediate layer composition directly onto the spherical body.

In case of injection molding the intermediate layer composition onto the spherical body to form the intermediate layer, it is preferred to use upper and lower molds, each having a hemispherical cavity. When molding the intermediate layer by the injection molding method, the hold pin is protruded to hold the spherical body, and the intermediate layer composition which has been heated and melted is charged and then cooled to form the intermediate layer.

When molding the intermediate layer by the compression molding method, the molding of the half shell may be performed by either a compression molding method or an injection molding method, and the compression molding method is preferred. Compression molding the intermediate layer composition into the half shell may be carried out, for example, under a pressure of 1 MPa or more and 20 MPa or less at a temperature of −20° C. or more and +70° C. or less relative to the flow beginning temperature of the intermediate layer composition. If the molding is carried out under the above conditions, the half shell having a uniform thickness can be formed. Examples of the method for molding the intermediate layer by using the half shell include a method of covering the spherical body with two of the half shells, and compression molding the spherical body with two of the half shells. Compression molding the half shells into the intermediate layer may be carried out, for example, under a pressure of 0.5 MPa or more and 25 MPa or less at a temperature of −20° C. or more and +70° C. or less relative to the flow beginning temperature of the intermediate layer composition. If the molding is carried out under the above conditions, the intermediate layer having a uniform thickness can be formed.

It is noted that the molding temperature means the highest temperature where the temperature at the surface of the concave portion of the lower mold reaches from closing the mold to opening the mold. In addition, the flow beginning temperature of the composition may be measured using the thermoplastic resin composition in a pellet form under the following conditions with "Flow Tester CFT-500" available from Shimadzu Corporation.
Measuring conditions: Plunger area: 1 cm$^2$, Die length: 1 mm, Die diameter: 1 mm, Load: 588.399 N, Starting temperature: 30° C., and Temperature rising rate: 3° C./min.

Examples of the method for molding the cover of the golf ball of the present invention include a method which comprises molding the cover composition into a hollow-shell, covering the core with a plurality of the hollow-shells and subjecting the core with a plurality of the hollow shells to the compression molding (preferably a method which comprises molding the cover composition into a half hollow-shell, covering the core with two of the half hollow-shells, and subjecting the core with two of the half hollow-shells to the compression molding); and a method which comprises injection molding the cover composition directly onto the core. The golf ball body having the cover formed thereon is ejected from the mold, and as necessary, the golf ball body is preferably subjected to surface treatments such as deburring, cleaning, and sandblast. In addition, if desired, a mark may be formed.

When molding the cover, concave portions called "dimple" are usually formed on the surface of the cover. The total number of dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

The golf ball body having the cover formed thereon is ejected from the mold, and is preferably subjected to surface treatments such as deburring, cleaning and sandblast where necessary. In addition, if desired, a paint film or a mark may be formed.

[Golf Ball]

The golf ball construction of the present invention is not particularly limited, as long as the golf ball comprises a core and at least one layer of an intermediate layer and at least one cover covering the intermediate layer. The FIGURE is a partially cutaway cross-sectional view of a golf ball according to one embodiment of the present invention. The golf ball 2 comprises a core 104, and an intermediate layer 106 covering the core 104, and a cover 112 covering the intermediate layer 106. A plurality of dimples 114 are formed on the surface of the cover. Other portion than the dimples 114 on the surface of the golf ball is a land 116. The golf ball is provided with a paint layer and a mark layer outside the cover, but these layers are not depicted.

The construction of the golf ball includes, but is not particularly limited to, for example, a three-piece golf ball composed of a single layered core and a single layered intermediate layer disposed around the core, and a single layered cover around the intermediate layer; a four-piece golf ball composed of a single layered core, two intermediate layers disposed around the core, and a single layered cover disposed around the intermediate layer; a multi-piece golf ball such as five or more piece composed of a single layered core, three or more intermediate layers disposed around the core and a single layered cover around the intermediate layer. The present invention is suitably applied to any one of the golf balls having the above construction.

The golf ball of the present invention preferably has a diameter in a range from 40 mm to 45 mm. In light of satisfying a regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball of the present invention preferably has a mass of 40 g or more and 50 g or less. In light of obtaining greater inertia, the mass is more preferably 44 g or more, particularly preferably 45.00 g or more. In light of satisfying a regulation of USGA, the mass is particularly preferably 45.93 g or less.

When the golf ball of the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.3 mm or more, and even more preferably 2.5 mm or more, and is preferably 4.0 mm or less, more preferably 3.8 mm or less, and even more preferably 3.5 mm or less. If the compression deformation amount is 2.0 mm or more, the golf ball does not become excessively hard, and thus the shot feeling thereof becomes better. On the other hand, if the compression deformation amount is 4.0 mm or less, the resilience of the golf ball becomes higher.

EXAMPLES

Next, the present invention will be described in detail by way of examples. However, the present invention is not limited to the examples described below. Various changes and modifications without departing from the spirit of the present invention are included in the scope of the present invention.

[Evaluation Methods]
(1) Compression Deformation Amount

A compression deformation amount of the core or golf ball (a shrinking amount of the core or golf ball along the compression direction), when applying a load from an initial load of 98 N to a final load of 1275 N to the core or golf ball, was measured.

(2) Core Hardness (Shore C Hardness)

The core hardness was measured with an automatic hardness tester (Digitest II available from Bareiss company). The testing device was "Shore C". The hardness at the surface of the core was adopted as the surface hardness of the core. In addition, the core was cut into two hemispheres to obtain a cut plane, and the hardness at the central point of the cut plane was measured.

(3) Slab Hardness (Shore D Hardness)

Sheets with a thickness of about 2 mm were produced by heat pressing the intermediate layer composition or the cover composition. The sheets were stored at a temperature of 23° C. for two weeks. At least three of these sheets were stacked on one another so as not to be affected by the measuring substrate on which the sheets were placed, and the hardness of the stack was measured with an automatic hardness tester (Digitest II, available from Bareiss company) using a testing device of "Shore D".

(4) Spin Rate and Flight Distance

The driver ("XXIO 10", Shaft:R, loft angel: 10.5°, available from Sumitomo Rubber Industries, Ltd) was installed on a swing robot available from Golf Laboratories, Inc. The golf ball was hit at a head speed of 38 m/sec, and the spin rate of the golf ball immediately after the hitting and the flight distance (the distance from the launch point to the stop point) was measured. The measurement was conducted twelve times for each golf ball, and the average value thereof was adopted as the measurement value for that golf ball. It is noted that the spin rate of the golf ball immediately after the hitting was measured by continuously taking a sequence of photographs of the hit golf ball.

(5) Shot Feeling

An actual hitting test was carried out by twenty golfers using a driver. Based on a number of golfers who felt shot feeling was soft, the shot feeling was evaluated in accordance with the following grading standard.

Grading Standard
  E (excellent): 16 or more golfers
  G (good): 10 or more and 15 or less golfers
  F (Fair): 3 or more and 9 or less golfers
  P (Poor): 2 or less golfers (6) Durability A W #1 driver provided with a metal head (XXIO 10, Shaft: R, loft angel: 10.5° available from Sumitomo Rubber Industries, Ltd) was installed on a swing robot M/C available from Golf Laboratories, Inc. The golf ball was hit repeatedly at a head speed of 45 m/sec until a crack occurred, and the hitting number when the crack occurred was counted. It is noted that the measurement was conducted using twelve samples for each golf ball, and the average value thereof was adopted as the hitting number for that golf ball. It is noted that the hitting number of the golf ball No. 8 was defined as 100, and the durability of each golf ball was represented by converting the hitting number of each golf ball into this index.

[Production of Golf Ball]
(1) Production of Core

The rubber compositions having the formulations shown in Table 1 were kneaded with a kneading roll, and heat pressed in upper and lower molds, each having a hemispherical cavity, at a temperature of 170° C. for 20 minutes to obtain spherical cores having a diameter of 38.6 mm. It is noted that barium sulfate was added in an appropriate amount such that the obtained golf balls had a mass of 45.6 g.

TABLE 1

| Rubber composition No. | | A | B | C | D | E | F | G | H | I | J | K | L |
|---|---|---|---|---|---|---|---|---|---|---|---|---|---|
| Polybutadiene | | 100 | 100 | 100 | 100 | 100 | 100 | 100 | 100 | 100 | 100 | 100 | 100 |
| Zinc oxide | | 5 | 5 | 5 | 5 | 5 | 5 | 5 | 5 | 5 | 5 | 5 | 5 |
| Zinc acrylate | | 31.6 | 32.3 | 30.3 | 32.9 | 31.3 | 31.0 | 28.7 | 29.3 | 24.1 | 32.1 | 33.6 | 31.4 |
| Barium sulfate | | *) | *) | *) | *) | *) | *) | *) | *) | *) | *) | *) | *) |
| PBDS | | 0.6 | 0.6 | 0.6 | 0.6 | 0.6 | 0.6 | 0.6 | 0.6 | 0.6 | 0.6 | 0.6 | 0.6 |
| Dicumyl peroxide | | 0.8 | 0.8 | 0.8 | 0.8 | 0.8 | 0.8 | 0.8 | 0.8 | 0.8 | 0.8 | 0.8 | 0.8 |
| TP2019 | | 3 | 3 | 3 | 3 | 3 | 3 | 3 | 3 | 0 | 5 | 15 | 1 |
| Vulcanzation Condition | Temperature(° C.) | 170 | 170 | 170 | 170 | 170 | 170 | 170 | 170 | 170 | 170 | 170 | 170 |
| | Time (min) | 20 | 20 | 20 | 20 | 20 | 20 | 20 | 20 | 20 | 20 | 20 | 20 |

*) Appropriate amount
Formulation: parts by mass

The materials used in Table 1 are shown below.

Polybutadiene: high-cis polybutadiene rubber BR730 (amount of cis-1,4 bond=95 mass %, amount of 1,2-vinyl bond=1.3 mass %, Moony viscosity ($ML_{1+4}$ (100° C.)=55, molecular weight distribution (Mw/Mn)=3) available from JSR Corporation Zinc oxide: "Ginrei R" available from Toho Zinc Co., Ltd.

Zinc acrylate: ZN-DA90S: zinc acrylate available from Nisshoku Techno Fine Chemical Co., Ltd.

Barium sulfate: "Barium Sulfate BD" available from Sakai Chemical Industry Co., Ltd.

PBDS: bis(pentabromophenyl) disulfide available from Kawaguchi Chemical Industry Co., Ltd.

Dicumyl peroxide: available from Tokyo Chemical Industry Co., Ltd.

TP2019 (Sylvares TP2019): pinene-phenol copolymer (softening point: 125° C.) available from KRATON CORPORATION (2) Preparation of Intermediate Layer Composition and Cover Composition According to the formulations shown in Table 2, the materials were mixed with a twin-screw kneading extruder to prepare a resin composition (an intermediate layer composition or a cover composition) in a pellet form. The extruding conditions were a screw diameter of 45 mm, a screw rotational speed of 200 rpm, and screw L/D=35, and the mixture was heated to 160 to 240° C. at the die position of the extruder.

TABLE 2

| Resin composition No. | a | b | c | d | e | f | g |
|---|---|---|---|---|---|---|---|
| Himilan AM7337 | 26 | 22 | 34 | — | — | — | 50 |
| Himilan AM7329 | 26 | 22 | 34 | 50 | 50 | — | 50 |
| Himilan 1605 | — | — | — | 47 | — | — | — |
| Himilan 1555 | — | — | — | — | — | 47 | — |
| Himilan 1557 | — | — | — | — | — | 46 | — |
| Surlyn 8150 | — | — | — | — | 50 | — | — |
| Surlyn 9150 | — | — | — | — | — | — | — |
| TEFABLOC T3221C | 48 | 56 | 32 | 3 | — | 7 | — |
| Titanium dioxide | 4 | 4 | 4 | 4 | 4 | 4 | 4 |
| JF-90 | 0.2 | 0.2 | 0.2 | 0.2 | 0.2 | 0.2 | 0.2 |
| Slab hardness(Shore D) | 35 | 30 | 45 | 63 | 68 | 57 | 66 |

Formulation: parts by mass

The materials used in Table 2 are shown below.

Himilan AM7337: Sodium ion-neutralized ethylene-methacrylic acid copolymer ionomer resin available from Du Pont-Mitsui Polychemicals Co., Ltd.

Himilan AM7329: Zinc ion-neutralized ethylene-methacrylic acid copolymer ionomer resin available from Du Pont-Mitsui Polychemicals Co., Ltd.

Himilan 1605: Sodium ion-neutralized ethylene-methacrylic acid copolymer ionomer resin available from Du Pont-Mitsui Polychemicals Co., Ltd.

Himilan 1555: Sodium ion-neutralized ethylene-methacrylic acid copolymer ionomer resin available from Du Pont-Mitsui Polychemicals Co., Ltd.

Himilan 1557: Zinc ion-neutralized ethylene-methacrylic acid copolymer ionomer resin available from Du Pont-Mitsui Polychemicals Co., Ltd.

Surlyn 8150: Sodium ion-neutralized ethylene-methacrylic acid copolymer ionomer resin available from Du Pont de Nemours, Inc.

Surlyn 9150: Zinc ion-neutralized ethylene-methacrylic acid copolymer ionomer resin available from Du Pont de Nemours, Inc.

TEFABLOC T3221C: thermoplastic styrene elastomer available from Mitsubishi Chemical Corporation A-220: titanium dioxide available from Ishihara Sangyo Kaisha, Ltd.

JF-90: Light stabilizer available from Johoku chemical Co., Ltd.

(3) Preparation of Golf Ball

The intermediate layer composition was injected around the spherical core to obtain a spherical body having an intermediate layer. The obtained spherical body was charged in a final mold composed of upper and lower molds, each having a hemispherical cavity. This final mold had a plurality of pimples on the cavity surface. The cover composition was filled around the spherical body by an injection molding method to mold the cover. Dimples having an inverted shape of the pimples were formed on the cover. The evaluation results of the obtained golf balls are shown in Table 3.

TABLE 3

| | | Golf Ball No. | | | | | | | |
|---|---|---|---|---|---|---|---|---|---|
| | | 1 | 2 | 3 | 4 | 5 | 6 | 7 | 8 |
| Core | Formulation No. | A | B | C | D | E | F | A | G |
| | Compression deformation amount(mm) | 4.00 | 3.90 | 4.20 | 3.80 | 4.05 | 4.10 | 4.00 | 4.45 |
| | Diameter (mm) | 38.6 | 38.6 | 38.6 | 38.6 | 38.6 | 38.6 | 38.6 | 38.6 |
| | Center hardness Ho (Shore C) | 63.9 | 64.5 | 62.8 | 65.1 | 63.6 | 63.3 | 63.9 | 61.3 |
| | Surface hardness Hs (Shore C) | 74.6 | 75.4 | 73.1 | 76.1 | 74.3 | 73.9 | 74.6 | 71.3 |
| | Hardness difference Hs − Ho (Shore C) | 10.7 | 10.9 | 10.3 | 11.0 | 10.7 | 10.6 | 10.7 | 10.0 |
| Intermediate Layer | Formulation No. | a | b | c | b | a | a | c | d |
| | Thickness (mm) | 1 | 1 | 1 | 1 | 1 | 1 | 1 | 1 |
| | Hardness Hm (Shore D) | 35 | 30 | 45 | 30 | 35 | 35 | 45 | 63 |
| Cover | Formulation No. | d | d | d | f | g | e | f | d |
| | Thickness (mm) | 1.05 | 1.05 | 1.05 | 1.05 | 1.05 | 1.05 | 1.05 | 1.05 |
| | Hardness Hc (Shore D) | 63 | 63 | 63 | 57 | 66 | 68 | 57 | 63 |
| Golf Ball | Compression deformation amount (mm) | 3.37 | 3.37 | 3.37 | 3.37 | 3.37 | 3.37 | 3.37 | 3.37 |
| | Hardness difference Hc − Hm (Shore D) | 28 | 33 | 18 | 27 | 31 | 33 | 12 | 0 |

TABLE 3-continued

|  |  |  |  |  |  |  |  |  |
|---|---|---|---|---|---|---|---|---|
| Spin rate (rpm) | 2600 | 2555 | 2645 | 2705 | 2570 | 2570 | 2795 | 2675 |
| Flight distance (m) | 196.6 | 197.1 | 196.2 | 195.7 | 196.9 | 196.9 | 194.9 | 196.0 |
| Shot feeling | E | E | F | E | G | F | G | F |
| Durability | 130 | 140 | 115 | 150 | 125 | 120 | 140 | 100 |

|  |  | Golf Ball No. | | | | | |
|---|---|---|---|---|---|---|---|
|  |  | 9 | 10 | 11 | 12 | 13 | 14 |
| Core | Formulation No. | G | H | I | J | K | L |
|  | Compression deformation amount(mm) | 4.45 | 4.35 | 4.25 | 3.90 | 3.70 | 4.05 |
|  | Diameter (mm) | 38.6 | 38.6 | 38.6 | 38.6 | 38.6 | 38.6 |
|  | Center hardness Ho (Shore C) | 61.3 | 61.9 | 57.3 | 64.2 | 64.4 | 63.5 |
|  | Surface hardness Hs (Shore C) | 71.3 | 72.0 | 78.8 | 71.8 | 67.8 | 77.1 |
|  | Hardness difference Hs − Ho (Shore C) | 10.0 | 10.1 | 21.5 | 7.6 | 3.4 | 13.6 |
| Intermediate Layer | Formulation No. | e | d | c | a | a | a |
|  | Thickness (mm) | 1 | 1 | 1 | 1 | 1 | 1 |
|  | Hardness Hm (Shore D) | 68 | 63 | 45 | 35 | 35 | 35 |
| Core | Formulation No. | f | f | d | d | d | d |
|  | Thickness (mm) | 1.05 | 1.05 | 1.05 | 1.05 | 1.05 | 1.05 |
|  | Hardness Hc (Shore D) | 57 | 57 | 63 | 63 | 63 | 63 |
| Golf Ball | Compression deformation amount (mm) | 3.37 | 3.37 | 3.37 | 3.37 | 3.37 | 3.37 |
|  | Hardness difference Hc − Hm (Shore D) | −11 | −6 | 18 | 28 | 28 | 28 |
|  | Spin rate (rpm) | 2705 | 2750 | 2600 | 2650 | 2900 | 2580 |
|  | Flight distance (m) | 195.7 | 195.3 | 196.6 | 196.2 | 193.9 | 196.8 |
|  | Shot feeling | P | F | P | E | P | E |
|  | Durability | 100 | 110 | 110 | 135 | 120 | 128 |

As apparent from the results of Table 3, the golf balls comprising a core, at least one intermediate layer covering the core and a cover covering the intermediate layer, wherein the core is formed from a core rubber composition containing (a) a base rubber containing a polybutadiene, (b) an α,β-unsaturated carboxylic acid having 3 to 8 carbon atoms and/or a metal salt thereof as a co-crosslinking agent, (c) a crosslinking initiator, and (d) a terpene-based resin, and a material hardness (Hm) of the intermediate layer and a material hardness (Hc) of the cover satisfy an equation of Hm≤Hc travel a great flight distance on driver shots and provide a good shot feeling and a good durability.

The golf ball according to the present invention has a great travel distance and excellent shot feeling and durability on driver shots. This application is based on Japanese patent application No. 2018-242103 filed on Dec. 26, 2018, the content of which is hereby incorporated by reference.

The invention claimed is:

1. A golf ball comprising a core, at least one intermediate layer covering the core and a cover covering the intermediate layer,
wherein
the core is formed from a core rubber composition containing:
(a) a base rubber containing a polybutadiene,
(b) an α,β-unsaturated carboxylic acid having 3 to 8 carbon atoms and/or a metal salt thereof as a co-crosslinking agent,
(c) a crosslinking initiator, and
(d) a terpene-based resin, wherein (d) the terpene-based resin is at least one member selected from the group consisting of a terpene-phenol copolymer, a terpene-styrene copolymer, a terpene-phenol-styrene copolymer, a hydrogenated terpene-phenol copolymer, a hydrogenated terpene-styrene copolymer, and a hydrogenated terpene-phenol-styrene copolymer, and (d) the terpene-based resin has a softening point of more than 100° C. and 150° C. or less, and
a material hardness (Hm) of the intermediate layer and a material hardness (Hc) of the cover satisfy an equation of Hm≤Hc.

2. The golf ball according to claim 1, wherein (d) the terpene-based resin is at least one member selected from the group consisting of compounds having a structure represented by the following formulae (1) and (2):

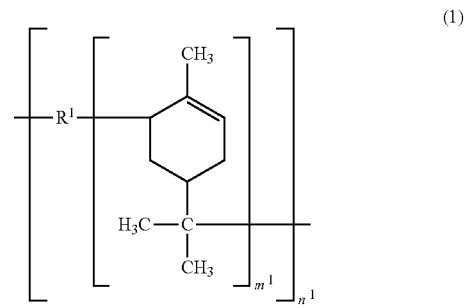

(1)

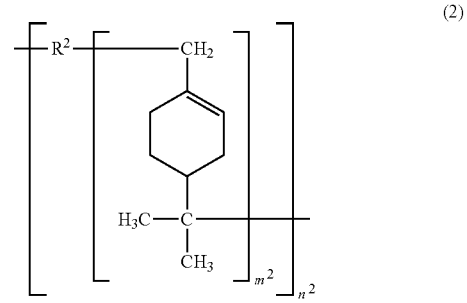

(2)

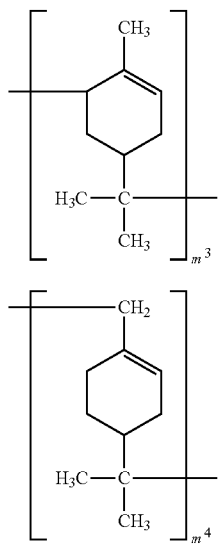

wherein in the formulae (1) and (2),

R¹ and R² each independently represent a divalent residue of a phenol-based compound and/or a styrene-based compound, m¹ and m² each independently represent a natural number of 1 to 30, and n¹ and n² each independently represent a natural number of 1 to 20.

3. The golf ball according to claim 1, wherein (d) the terpene-based resin is at least one member selected from the group consisting of an α-pinene-phenol copolymer, an α-pinene-α-methylstyrene copolymer, an α-pinene-α-methylstyrene-phenol copolymer, a β-pinene-phenol copolymer, a β-pinene-α-methylstyrene copolymer, and a β-pinene-α-methylstyrene-phenol copolymer.

4. The golf ball according to claim 1, wherein the core rubber composition contains (d) the terpene-based resin in an amount of from 0.5 part by mass to 10 parts by mass with respect to 100 parts by mass of (a) the base rubber.

5. The golf ball according to claim 1, wherein a blending ratio (component (b)/component (d)) of the component (b) to the component (d) ranges from 2.0 to 40.0 in a mass ratio.

6. The golf ball according to claim 1, wherein the polybutadiene includes a high-cis polybutadiene having a cis-1,4 bond in an amount of 90 mass % or more.

7. The golf ball according to claim 1, wherein a surface hardness (Hs) of the core ranges from 60 to 85 in Shore C hardness.

8. The golf ball according to claim 1, wherein a central hardness (Ho) of the core ranges from 40 to 75 in Shore C hardness.

9. The golf ball according to claim 1, wherein a hardness difference (Hs−Ho) between a surface hardness (Hs) of the core and a central hardness (Ho) of the core ranges from 5 to 35 in Shore C hardness.

10. The golf ball according to claim 1, wherein the terpene-phenol copolymer has an acid value in a range of from 10 mgKOH/g 300 mgKOH/g.

11. The golf ball according to claim 1, wherein the terpene-phenol copolymer has a hydroxy value in a range of from 30 mgKOH/g to 150 mgKOH/g.

12. The golf ball according to claim 1, wherein the intermediate layer is formed from a composition containing a thermoplastic resin.

13. The golf ball according to claim 1, wherein (d) the terpene-based resin has a softening point of from 120° C. to 150° C.

14. The golf ball according to claim 1, wherein the core has a diameter in a range from 34.8 mm to 42.2 mm and a compression deformation amount of 3.5 mm or more when applying a load from an initial load of 98 N to a final load of 1275 N to the core, and a hardness difference (Hs−Ho) between a surface hardness (Hs) of the core and a central hardness (Ho) of the core ranges from 5 to 20 in Shore C hardness.

15. A golf ball comprising a core, at least one intermediate layer covering the core and a cover covering the intermediate layer, wherein the core is formed from a core rubber composition containing (a) a base rubber containing a polybutadiene, (b) an α,β-unsaturated carboxylic acid having 3 to 8 carbon atoms and/or a metal salt thereof as a co-crosslinking agent, (c) a crosslinking initiator, and (d) a terpene-based resin, and a material hardness (Hm) of the intermediate layer and a material hardness (Hc) of the cover satisfy an equation of Hm≤Hc, the core rubber composition contains (d) the terpene-based resin in an amount of from 0.5 parts by mass to 10 parts by mass with respect to 100 parts by mass of (a) the base rubber, and (d) the terpene-based resin is at least one member selected from the group consisting of an α-pinene-phenol copolymer, an α-pinene-α-methylstyrene copolymer, an α-pinene-α-methylstyrene-phenol copolymer, a β-pinene-phenol copolymer, a β-pinene-α-methylstyrene copolymer, and a β-pinene-α-methylstyrene-phenol copolymer.

* * * * *